United States Patent [19]
Voigt

[11] 4,039,246
[45] Aug. 2, 1977

[54] OPTICAL SCANNING APPARATUS WITH TWO MIRRORS ROTATABLE ABOUT A COMMON AXIS

[75] Inventor: Allan Alfred Voigt, Anaheim, Calif.

[73] Assignee: General Dynamics Corporation, Pomona, Calif.

[21] Appl. No.: 651,495

[22] Filed: Jan. 22, 1976

[51] Int. Cl.² .................. G02B 27/17; G01J 1/20; H01J 3/14; F41G 7/12
[52] U.S. Cl. .................. 350/7; 250/203 R; 250/236; 244/3.16
[58] Field of Search .................. 350/7, 6; 250/203 R, 250/234–236; 244/3.16

[56] References Cited
U.S. PATENT DOCUMENTS

| | | | |
|---|---|---|---|
| 3,076,095 | 1/1963 | Becklund et al. | 250/203 R |
| 3,158,676 | 11/1964 | McCaffrey | 250/203 R |
| 3,330,958 | 7/1967 | Kaisler et al. | 250/203 R |
| 3,752,998 | 8/1943 | Stripling et al. | 350/7 |

*Primary Examiner*—Jon W. Henry
*Attorney, Agent, or Firm*—Neil F. Martin; Edward B. Johnson

[57] ABSTRACT

Apparatus for scanning the field of view of an optical objective. A primary mirror is mounted for rotation about a spin axis. A secondary mirror supports an electrical motor magnet and is mounted for rotation about the spin axis. A non-rotating stator is mounted behind the secondary mirror and supports the electric motor coils. The primary and secondary mirrors are canted slightly out of perpendicularity with the spin axis. The primary and secondary mirrors and the electric motor stator are fully gimbaled for tracking a target. The scanning patterns of the primary and secondary mirrors combine to scan a rosette pattern across a sensor.

10 Claims, 4 Drawing Figures

OPTICAL SCANNING APPARATUS WITH TWO MIRRORS ROTATABLE ABOUT A COMMON AXIS

BACKGROUND OF THE INVENTION

In gyro-optical objective systems and other optical telescope applications it is frequently desirable to scan the field of a radiation sensor across a field of an optical objective to determine the orientation of the radiation source relative to the axis of the optical system. Of the various scanning patterns available, the rosette scan is particularly advantageous in that a radiation sensor with a relatively small field of view can be scanned across the entire field of the optical objective to produce a circular search pattern with a relatively large field of view. Of the variety of prior art systems utilized to produce a rosette scanning pattern, it has been found that the use of two rotating mirrors eliminates or minimizes the difficulty encountered in the use of prismatic elements. Chromatic and other aberrations are often encountered with refractive prismatic elements and are largely uncorrectable due to the rotational nature of the principle axis of these aberrations. Also, the rotating mirrors are not limited in their effective wavelength regions as are prismatic elements.

In the prior art, the packaging of a counter rotating mirror system has presented certain problems that until the development of the present invention have lacked a solution. In most prior art systems where the primary and secondary mirrors rotate countercurrently, separate drive systems are necessary. Commonly, smaller secondary mirrors have been driven by an electric motor that is independent of the primary mirror drive system. The prior art use of electric motors has required sliding contacts such as motor brushes, grounding brushes for electro-static noise reduction or a slip ring assemblies. These components are highly undesirable in the environment of a radiation seeker head. The varying resistance at the sliding contacts induces noise. Also, the wear and associated limited life and unreliability of the typical miniature high speed brush assemblies may degrade the performance of the seeker head.

A particular prior art scanning system utilizes a non-rotating electro-magnet. The electro-magnet is used to oscillate a scanning mirror rather than rotating the mirror. A separate drive motor is mounted in the extreme aft part of the apparatus to rotate the mirror. This system is ineffective for use in a seeker head because the most efficient use of a seeker head calls for fully gimbaling all of the optical elements. The drive motor in this prior art structure is not capable of a gimbal mounting and unnecessarily complicates the structure of the seeker head.

In yet another prior art device, an optical scanner is mounted within a flywheel, the flywheel being utilized to stabilize the vehicle. In this device the stator and the core are non-rotating and mounted behind a spinning optical member. This device is not designed to seek a moving optical objective and accordingly, is not gimbled.

It is therefore desirable to have an optical scanning system in which the electric motor that drives the scanning mirror is directly coupled to the drive power supply thus eliminating the need for slip rings brushes and the like. It is likewise desirable that the system be fully gimbaled to continually track an optical objective that is changing its position relative to the seeker head.

SUMMARY OF THE INVENTION

The invention is utilized to scan the field of an optical objective to determine the direction, spatial origin, or spatial characteristics of a radiation source or radiation distribution pattern. With specific application to a gyro-optical system used in the guidance of a radiation seeking missile, the invention can be made to execute the scanning pattern known as a "rosette". A particularly significant virtue of the rosette lies in the fact that the maximum information sampling of the pattern exists at the center of the pattern which renders the system inherently less sensitive to the effects of spurious targets. Accordingly, an exemplary embodiment of the invention packages the scanning apparatus within a head dome that is transparent to radiation of selected wavelengths. Incoming radiation is incident upon a primary beam director means that is formed on the forward face of a magnetic gyro-mass. The rotation of the gyro-mass is controlled by means of precession coils mounted on a coil cage adjacent the gyro-mass. The gyro-mass is driven by means of a rotating electric signal in the precession coils. The gyro-mass spins about a spin bearing mounted in the forward part of the head dome. Also, the gyro-mass is fully gimbaled about gimbal bearings associated with inner and outer gimbal rings. The reflective face of the primary beam director means is canted slightly out of perpendicularity with respect to the primary optic axis of the apparatus. The motion of the primary beam director means generates a first scanning pattern component that makes up the rosette scanning pattern produced by the apparatus.

The reflective face of the magnetic gyro-mass diverts incoming radiation toward the primary optic axis and to a beam director means that may be referred to as secondary because of its relation with respect to the radiation. The secondary beam director means includes a reflective member in the form of a mirror mounted for rotation about the primary optic axis. The mirror hereinafter referred to as the plane mirror may be perfectly planar or generally planar with a slight curvature. A shim is wedged between rotor flanges and the plane mirror to cant the plane mirror slightly out of perpendicularity with respect to the primary optic axis. The motion of the secondary beam director means produces the second scanning component that when combined with the scanning component produced by the primary beam director means produces the rosette scanning pattern of the apparatus.

Rotation means in the form of an electric motor rotates the plane mirror about the primary optic axis. A first part of the electric motor, an annular magnet, is mounted on the forward side of the rotor flange. A second part of the rotation means, a stator and coil assembly, is mounted forward of the annular magnet, and does not rotate. The entire stator assembly is mounted on support means about which the primary beam director means rotates. The stator assembly, through non-rotating with respect to the magnet and plane mirror, is fully gimbaled along with the rest of seeker apparatus. The benefits of having a non-rotating rotor are that direct electrical contact can be affected with a drive power supplier eliminating the need for brushes, slip rings or the like. When a target is in the total field of the rosette, but not coincident with the center of the rosette pattern, pulse signals generated by a sensor provide error information to external processing circuitry. From this circuitry, a correctly phased precession signal is derived that is applied to the precession coils, which in turn generate the required magnetic flux to move the primary beam director means in the proper direction to return the target image to the center of the scanned rosette field. Since all of the optical components of the apparatus are fully gimbaled, the seeker system can maintain a lock on a target and continually track target angular deviations with respect to the primary optic axis.

It is therefore an object of the invention to provide a new and improved optical scanning system.

Another object of the invention is to provide a new and improved optical scanning system that is primarily reflective in nature.

Another object of the invention is to provide a new and improved optical scanning system with inherent pattern closure.

Another object of the invention is to provide a new and improved optical scanning system with reduced chromatic and other aberation.

Another object of the invention is to provide a new and improved optical scanning system that utilizes an electro-magnetic drive motor to drive a secondary beam director.

Another object of the invention is to provide a new and improved optical scanning system that utilizes an electro-magnetic drive motor to drive a secondary beam director but eliminates the use of slip rings, brushes and the like.

Another object of the invention is to provide a new and improved optical scanning system that is low in noise production.

Another object of the invention is to provide a new and improved optical scanning system that is fully gimbaled.

Another object of the invention is to provide a new and improved optical scanning system that is characterized by mechanical simplicity, reliability, is compact and efficient.

The above and other objects of the invention will be apparent as the description continues and when read in conjunction with the appended drawings.

DETAILED DESCRIPTION OF THE DRAWINGS

Figure 1:
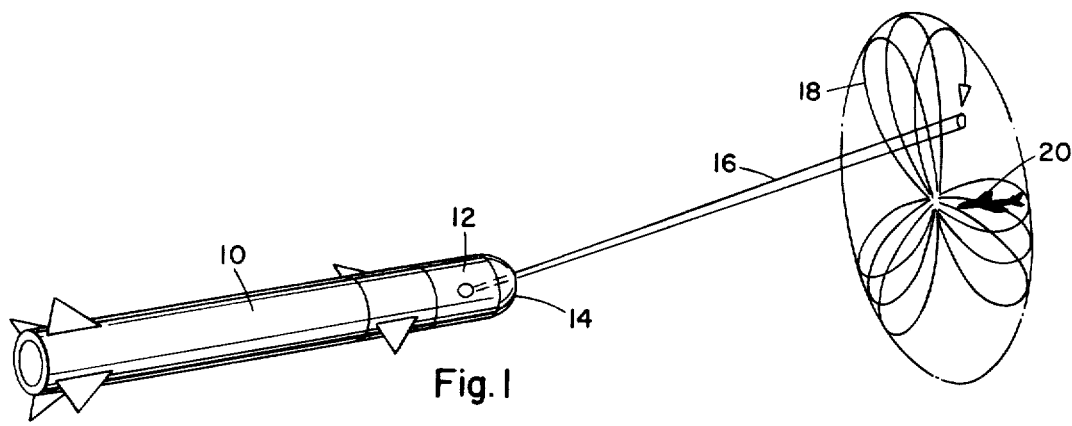
FIG. 1 illustrates the rosette scanning pattern in relation to a typical missile incorporating the seeker head.

Referring now to the drawings, there is illustrated in FIG. 1 a typical vehicle 10 that mounts a seeker head 12 in the vicinity of the head dome 14. The projected field of view is illustrated by the beam 16 which describes a rosette pattern 18, making up, in successive passes the entire circular field of view of the objective. With this type of scan, the comparatively small instantaneous field of view of a radiation sensor in conjunction with the focal length of the objective is caused to describe rapid and repetitive sinusoidal excusions forming "leaves" which are displaced angularly at a relatively slower rate to constitute a circular geometric search pattern having a comparatively large field of view. The field of view is shown to include an intruder aircraft or target 20 that stimulates a radiation sensor to produce electrical pulse signals whenever the sensors field of view coincides with it. The signals, in turn, provide error information to cause an auxiliary precession system to properly reorientate the gyro-optical axis and thereby return the target image to the center of the scanned rosette field.

Figure 2:
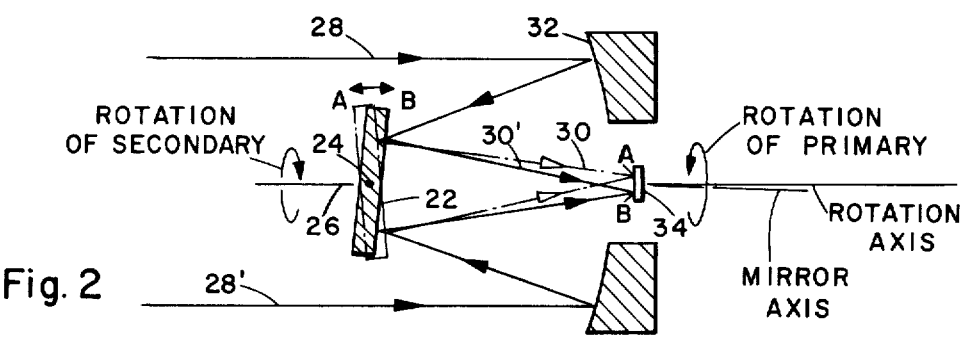
FIG. 2 is a diagram of the basic optical system.

As illustrated in FIG. 2, one component in the production of the rosette scan 18 involves the rotation of a secondary reflector or plane mirror 22 about its axis of rotation 26. The rotation takes place in the direction indicated by the arrow. Simultaneously, the plane mirror 22 may be oscillated about the axis of oscillation 24 as indicated by the double headed arrow. The mirror 22 causes the incident beams of light 28 and 28' to oscillate between positions A and B on the projected beams 30 and 30'. The same scanning pattern may be described by substituting the oscillation of the mirror 22 about the axis of oscillation 24 with a slight canting of the mirror 22 with respect to the axis of rotation 26 and rotating the mirror 22 in the manner previously described. It is evident that the scanning pattern thus obtained is identical however, the motion of the mirror 22 is simplified in that it need only be driven rotationally and the oscillations thereof are a result of its canted position.

In FIG. 2, the cooperative relationship between the primary reflector 32 and the secondary or plane mirror 22 is illustrated. Parallel incident beams of light 28 and 28' from a distant target are illustrated as being reflected from the primary reflector 32 to the plane mirror 22. In the B position of the mirror 22, the rays 30' are caused to converge at point B on the sensor 34. In the A position of the mirror 22, and beams 30 are caused to converge at point A on the sensor 34. Thus, the field of view of the sensor 34 is scanned across the field of the target 20.

Figure 3:
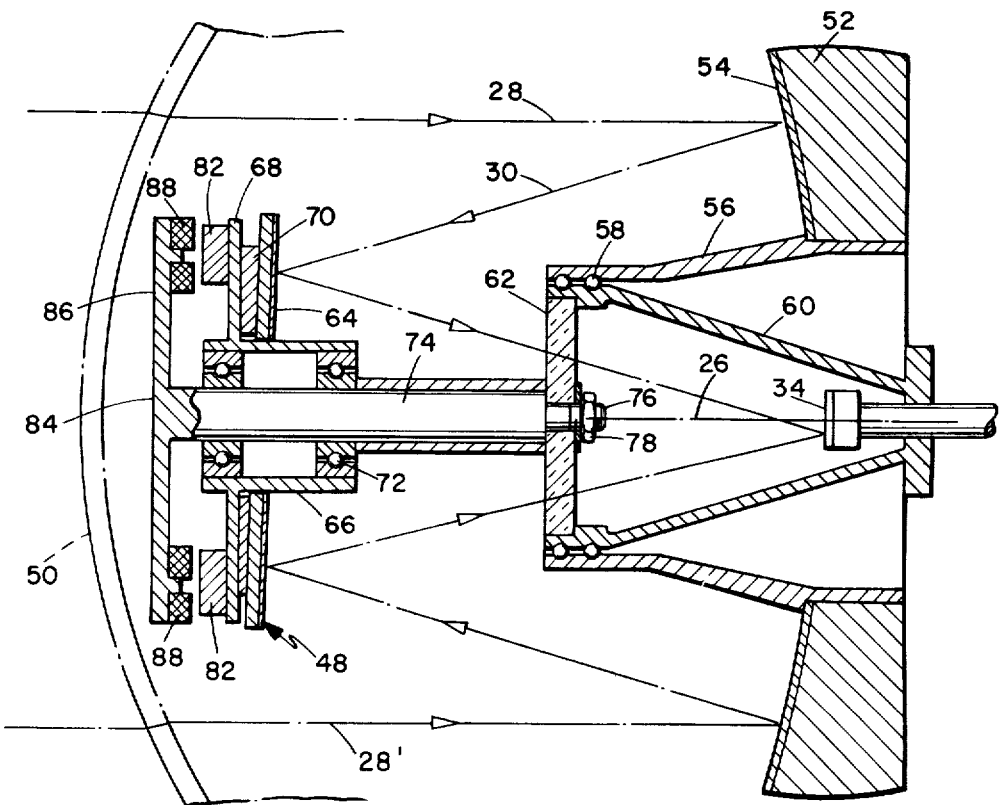
FIG. 3 is an axial sectional view of one embodiment of the optical system.

Referring now to FIG. 3, an embodiment of the secondary beam director system 48 is illustrated. The incoming radiation beams 28 and 28' strike the convex reflective surface 54 formed on the primary mirror 52. The primary mirror 52 is formed as part of a magnetized gyro-rotor that is mounted on the support assembly 56 for rotation about the gyro-spin bearing 58. The gyro-spin bearing 58 is mounted on an optical barrel 60, which can be supported in a fully gimbaled but non-rotating support, not shown. The optical barrel 60 mounts a support window 62.

The secondary beam director system 48 includes the annular plane mirror 64. The mirror 64 is mounted on a rotor 66 for rotation about the primary optic axis 26. The rotor 66 includes a radial flange 68. An offset shim 70 of gradually increasing thickness is disposed between the mirror 64 and the flange 68. The function of the shim 70 is to cant the mirror 64 with respect to the axis 26. Therefore, rotation of the mirror 64 causes the same to oscillate as previously described so as to scan the image across the sensor 34. The rotor 66 is mounted for spinning about axis 26 by means of the spin bearings 72. The spin bearings 72 are mounted about a support post 74 having a threaded end 76 which projects through a hole in the support window 62, and a nut 78 is secured on the threaded end 76 to maintain the respective positions of the various elements.

The rotor 66 carries magnetic inserts 82 on the forward side thereof. A stator 84 is mounted on the support post 74 in the forward part of the area defined by the head dome 50. The stator 84 comprises the back iron 86 and the coils 88. By means of electrical signals supplied to the coils via an external drive power supply, the rotor 66, via the magnetic inserts 82 is rotated about the primary optic axis 26. A typical secondary rotation frequency versus primary rotation frequency is 16 to 7. The multiple oscillations during each rotation of the mirror 64 produces an overlapping pattern wherein leaves of the rosette pattern 18 are generated and overlapped so that information from all sectors of the field of view of the objective are obtained with minimum delay. While the stator 84 is fully gimbaled, it does not rotate since it is directly connected to the support window 62 which also does not rotate. The advantage of this arrangement is that it permits electrical connections between the secondary spin motor driver electronics (not shown) and the stator 84 to be made without any sliding contacts or brushes. Thus, noise that would otherwise be generated by the varying resistance at the sliding contacts, and associated limited life of miniature high speed brush and ring assemblies are eliminated.

Figure 4:
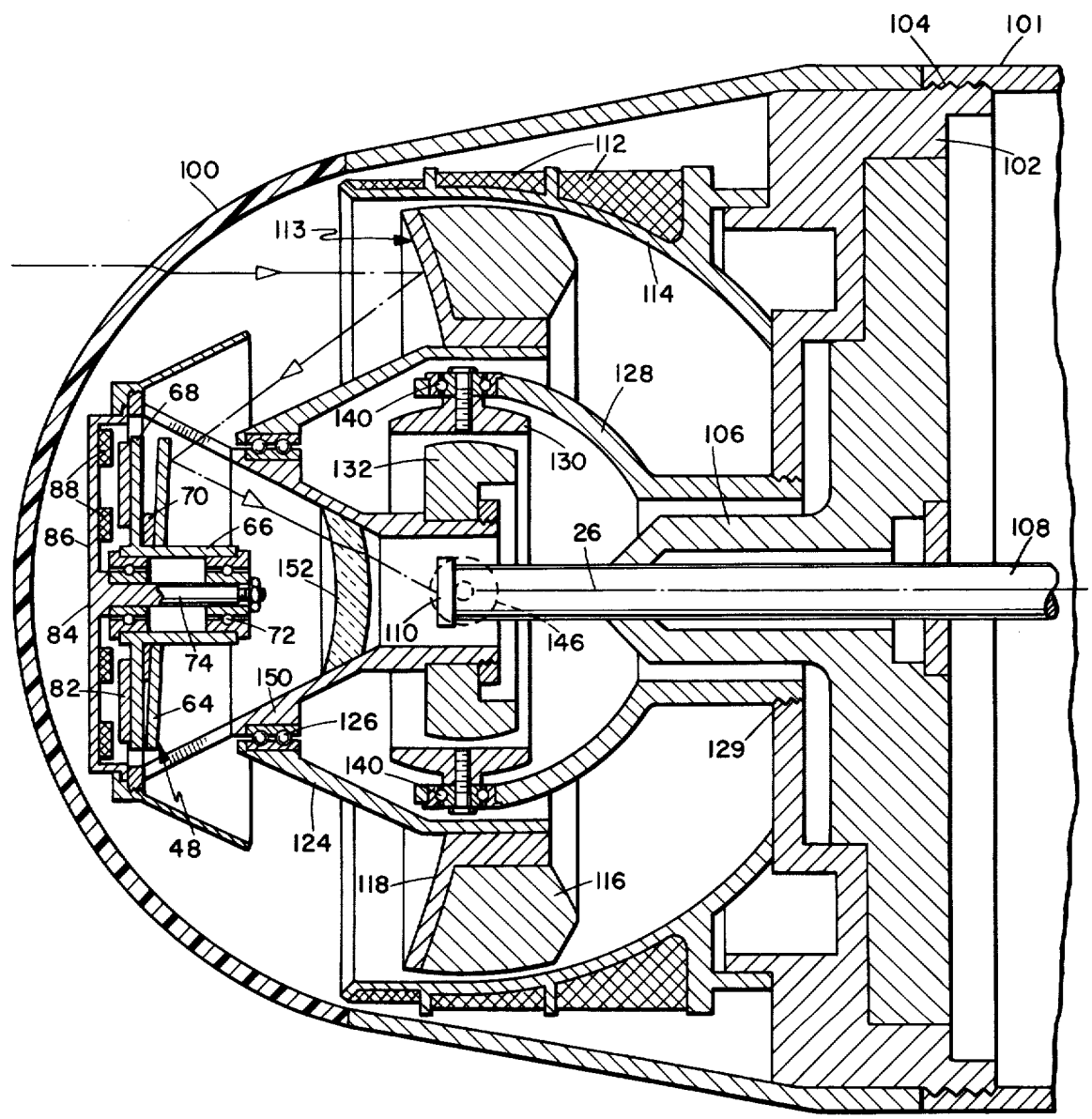
FIG. 4 is an axial sectional view of a complete seeker head incorporating the optical system.

Turning now to FIG. 4, the application of the principles of the primary embodiment to a missile seeker head is illustrated. The missile seeker head dome 100 and case 101 contain all of the structure associated with the seeker head optics. The head dome 100 is transparent to radiation of selected wavelengths. The case 101 threadably engages a mounting bulkhead 102 by means of the threads 104. The bulkhead 102 also supports a journal 106 which carries a transducer support post 108. A radiation sensor 110 is carried by the post 108 at the forward end thereof. Precession coils 112 are mounted on a cage 114 that is supported by the bulkhead 102. A correctly phased precession signal is derived from external circuitry and is applied to the precession coils. The precession coils, in turn, generate the required magnetic flux to move the primary beam director 113 in the proper direction to place the target in the center of the rosette scanning pattern 18. The primary beam director 113 comprises a permanent magnet substrate 116 that, as previously described, forms the gyro-mass of the system. A reflective surface 118 is on the forward side of substrate 116. The substrate 116 rotates about the primary optic axis 26. The reflective surface 118 rotates at a slight cant of about 1° to the primary optic axis 26, as in FIG. 2. This generates one of the two scanning components of the rosette scanning pattern 18. The substrate 116 is mounted on a housing 124 that projects forward into the head dome 100. The housing 124 spins about the gyro-spin bearing 126. The entire optical system of the seeker head is gimbaled about the gimbal housing 128. The gimbal housing 128 is threadably engaged to the mounting bulkhead 102 by means of the threads 129. An outer gimbal ring 130 is mounted for rotation in the gimbal housing 128 by means of the gimbal bearings 140. An inner gimbal ring 132 is pivotal about gimbal bearings 146 in outer ring 130.

The gyro-spin bearing 126 is mounted between the housing 124 and a support assembly 150. The support assembly 150 is mounted on the inner gimbal ring 132 and also carries the stator 84. As in the previous embodiment, the stator 84 is fully gimbaled via its connection to the inner gimbal ring 132, but it does not rotate. In this embodiment, the support assembly 150 contains a lens 152 configured to provide sufficient positive power and similar dispersion to that of the dome 100 to compensate for negative chromatic aberration introduced by the dome 100.

The scanning patterns produced by the primary mirror 118 and the secondary mirror 64 combine to produce the rosette pattern 18. The rosette pattern 18 is preferred in that the maximum data rate is obtained with a target 20 at the central point and the structure previously described produces closure of the pattern. The significant virtue of the rosette scan lies in the fact that the system is inherently less sensitive to the effects of spurious targets or confusing spatial radiation pattern distribution.

The diameter of the spin bearings 72 is relatively small permitting the secondary beam director assembly 48 to obtain high rotational velocities with low frictional loss. This permits the secondary spin motor to provide the required velocity at a small fraction of the power required by most previous designs. The location of the secondary spin motor in the extreme forward portion of the seeker allows the greatest practical separation between the secondary spin motor and the sensor 110. This reduces the noise pick-up in the very high gain detective circuitry of the seeker and thus improves the seeker signal to noise ratio. Additionally, the locating of the secondary spin motor in the extreme forward part of the area defined by the dome 100 reduces drift induced in the substrate 116 by the same attracting the ferromagnetic materials of the secondary spin motor.

Having described my invention, I now claim:

1. Scanning apparatus for use in a scanning optical system comprising:

beam director means for directing incident rays of radiation from a radiation source to produce a first scanning pattern, first rotation means for rotating said beam director means about a spin axis, a first part of said first rotation means associated with said beam director means and rotating therewith, a second part of said first rotation means non-rotatably mounted adjacent said first part of said first rotation means, whereby said second part of said first rotation means may be directly coupled to a drive power supply, gimbal mounting means for mounting said beam director means and said first rotation means first and second parts, primary beam director means for receiving radiation rays from a radiation source and diverting same to said beam director means, said beam director means mounted for rotation about said spin axis and canted out of perpendicularity with respect thereto to generate a second scanning pattern, second rotation means independent of said first rotation means for rotating said primary beam director means.

2. The scanning apparatus of claim 1 including:

sensor means supported in radiation receiving relation with respect to said beam director means and for receiving the scanning pattern generated thereby.

3. The scanning apparatus of claim 1 wherein:

said primary beam director means comprises a magnetic gyro-mass, a reflective face formed on the forward side of said mass, a first spin bearing mounted forward of said mass and adjacent said beam director means, said gyro-mass being mounted for rotation about said first spin bearing.

4. The scanning apparatus of claim 3 including:

support means for mounting said first spin bearing, said support means projecting forward toward said beam director means and supporting said rotation means second part.

5. The scanning apparatus of claim 1 wherein:

said first part of said first rotation means comprises a magnetic member associated with said beam director means and assuming the rotational motion of said beam director means, said second part of said first rotation means comprises an electro-magnetic member operative to drive said magnetic member to rotate said beam director means, said electro-magnetic member is non-rotatably mounted adjacent said magnetic member for direct coupling to a drive power supply.

6. The scanning apparatus of claim 5 wherein:

said rotation means second part further comprises a non-rotating stator, and said electro-magnetic member comprises electro-magnetic coils mounted on said stator.

7. The scanning apparatus of claim 6, wherein:

said stator comprises a shaft, a spin bearing is between said shaft and said rotor, and said beam director means is adapted to spin about said spin bearing.

8. The scanning apparatus of claim 5 wherein:

said magnetic member is annular, said second rotation means further comprises a rotor mounted for rotation about a spin axis, said beam director means further comprises a reflective member mounted on said rotor.

9. The scanning apparatus of claim 8 wherein:

said reflective member is a plane mirror mounted for spinning about said spin axis and canted out of perpendicularity therewith.

10. The scanning apparatus of claim 9 including:

a shim received between said rotor and said reflective member adapted to cant said reflective member out of perpendicularity with said spin axis.

* * * * *